US011306190B2

(12) United States Patent
Keating et al.

(10) Patent No.: US 11,306,190 B2
(45) Date of Patent: Apr. 19, 2022

(54) METHOD FOR PROVIDING A MODIFICATION TO A POLYMERIC SURFACE

(71) Applicant: Rensselaer Polytechnic Institute, Troy, NY (US)

(72) Inventors: John Joseph Keating, Troy, NY (US); Georges Belfort, Slingerlands, NY (US); Istvan Zsolt Kocsis, Montpellier (FR); Mirco Sorci, Troy, NY (US); Alexander Kenneth Lee, Arlington, MA (US)

(73) Assignee: Rensselaer Polytechnic Institute, Troy, NY (US)

( * ) Notice: Subject to any disclaimer, the term of this patent is extended or adjusted under 35 U.S.C. 154(b) by 0 days.

(21) Appl. No.: 16/331,338

(22) PCT Filed: Sep. 8, 2017

(86) PCT No.: PCT/US2017/050675
§ 371 (c)(1),
(2) Date: Mar. 7, 2019

(87) PCT Pub. No.: WO2018/049157
PCT Pub. Date: Mar. 15, 2018

(65) Prior Publication Data
US 2019/0345302 A1 Nov. 14, 2019

Related U.S. Application Data

(60) Provisional application No. 62/531,623, filed on Jul. 12, 2017, provisional application No. 62/423,241, (Continued)

(51) Int. Cl.
C08J 7/16 (2006.01)
C09D 7/20 (2018.01)
(Continued)

(52) U.S. Cl.
CPC .............. *C08J 7/16* (2013.01); *C09D 4/00* (2013.01); *C09D 7/20* (2018.01); *C09D 125/04* (2013.01); *C09D 133/10* (2013.01); *C09D 133/14* (2013.01)

(58) Field of Classification Search
CPC .............. C08J 7/16; C09D 7/20; C09D 4/00
See application file for complete search history.

(56) References Cited

U.S. PATENT DOCUMENTS 8,557,031 B1 10/2013 Hibbs et al.
2004/0138332 A1* 7/2004 Aubart ................. C07D 401/14
523/122

(Continued)

OTHER PUBLICATIONS

International Search Report and The Written Opinion of the International Searching Authority, International Application No. PCT/US2017/050675, dated Nov. 17, 2017.

*Primary Examiner* — Nathan T Leong
(74) *Attorney, Agent, or Firm* — Murtha Cullina LLP; Anthony P. Gangemi

(57) ABSTRACT

A method for modifying a polymeric surface is disclosed. The polymeric surface is activated utilizing atmospheric pressure plasma. An atom transfer radical polymerization initiator is then coupled to the activated surface. A monomer is then polymerized on the activated surface utilizing an activators regenerated by electron transfer (ARGET) atom transfer radical polymerization (ATRP) process. The method enables brush-modification of the polymeric surface, even if the polymeric surface is substantially chemically inert. By way of example, the method enables a chemically inert, substantially hydrophobic polymer surface to be functionalized with substantially hydrophilic polymer brushes. The methods of the present disclosure have general applicability to a myriad of implementations where tunable surface chemistry is advantageous, such as filtration membranes, (Continued)

marine surfaces, and medical devices seeking a biocompatible coating.

20 Claims, 5 Drawing Sheets

Related U.S. Application Data filed on Nov. 17, 2016, provisional application No. 62/384,749, filed on Sep. 8, 2016.

(51) Int. Cl.
*C09D 4/00* (2006.01)
*C09D 125/04* (2006.01)
*C09D 133/10* (2006.01)
*C09D 133/14* (2006.01)

(56) References Cited

U.S. PATENT DOCUMENTS

| | | | |
|---|---|---|---|
| 2010/0035074 A1 | 2/2010 | Cohen et al. | |
| 2012/0184029 A1* | 7/2012 | Atanasova | C12M 23/20 |
| | | | 435/304.1 |
| 2013/0280641 A1 | 10/2013 | Liiv | |
| 2014/0058032 A1* | 2/2014 | Huang | C08F 291/00 |
| | | | 524/547 |

* cited by examiner

METHOD FOR PROVIDING A MODIFICATION TO A POLYMERIC SURFACE

CROSS REFERENCE TO RELATED APPLICATION(S)

This application is a national stage filing of International Patent Application No. PCT/US2017/050675, filed Sep. 8, 2017, which claims the benefit of U.S. Provisional Application Nos. 62/384,749, filed Sep. 8, 2016, and 62/423,241, filed Nov. 17, 2016, and 62/531,623, filed Jul. 12, 2017, which are incorporated by reference as if disclosed herein in their entireties.

STATEMENT REGARDING FEDERALLY SPONSORED RESEARCH OR DEVELOPMENT

This invention was made with government support under CBET-1546589 awarded by the National Science Foundation. The government has certain rights in the invention.

BACKGROUND

The development of new and improved polymers for use in applications such as membrane filtration or medical implants continues to be a subject garnering significant attention from industry experts. Surface modification of such polymeric substrates with new interfacial properties offer alternative routes for tuning the performance of these substrates.

Substantially chemically inert polymers, such as poly (ether sulfone), are generally desirable, and can exhibit advantageous thermal and/or mechanical properties as well. However, the surface chemistry of such chemically inert polymers is also difficult to tune. To overcome this, efforts such as blending amine-terminated poly(ether sulfone) into the casting solution prior to substrate formation have been used to introduce reactive amine groups for coupling of Atom Transfer Radical Polymerization (ATRP) initiators. Other groups have attempted to functionalize the polymers through chloromethylation reactions prior to casting. The benzyl chloride groups introduced into the polymers were directly capable of initiating an ATRP reaction. However, these techniques use chemistry on polymers prior to substrate casting, which is disadvantageous. Methods for modifying polymeric commercial membrane supports would allow independent tuning of the underlying pore structure and readily fit into existing membrane manufacturing processes, whereas the techniques involving modifying these polymeric commercial membrane supports prior to casting do not allow for these advantages.

SUMMARY

Some embodiments of the disclosed subject matter are directed to a method of modifying a polymeric surface that includes activating the polymeric surface with atmospheric pressure plasma and coupling an ATRP initiator to the activated surface. In some embodiments, the polymer surface is composed of a substantially chemically inert polymer. In some embodiments, a monomer for functionalizing the activated surface is provided and polymerized on the surface. In some embodiments, the polymerization is performed in the presence of a catalyst. In some embodiments, the polymerization is performed in the presence of a ligand. In some embodiments, the polymerization is performed in the presence of a reducing agent. In some embodiments, the polymerization is performed in the presence of a solvent. In some embodiments, the polymeric surface is substantially hydrophobic and the monomers are substantially hydrophilic.

BRIEF DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein.

DETAILED DESCRIPTION

Figure 1A:
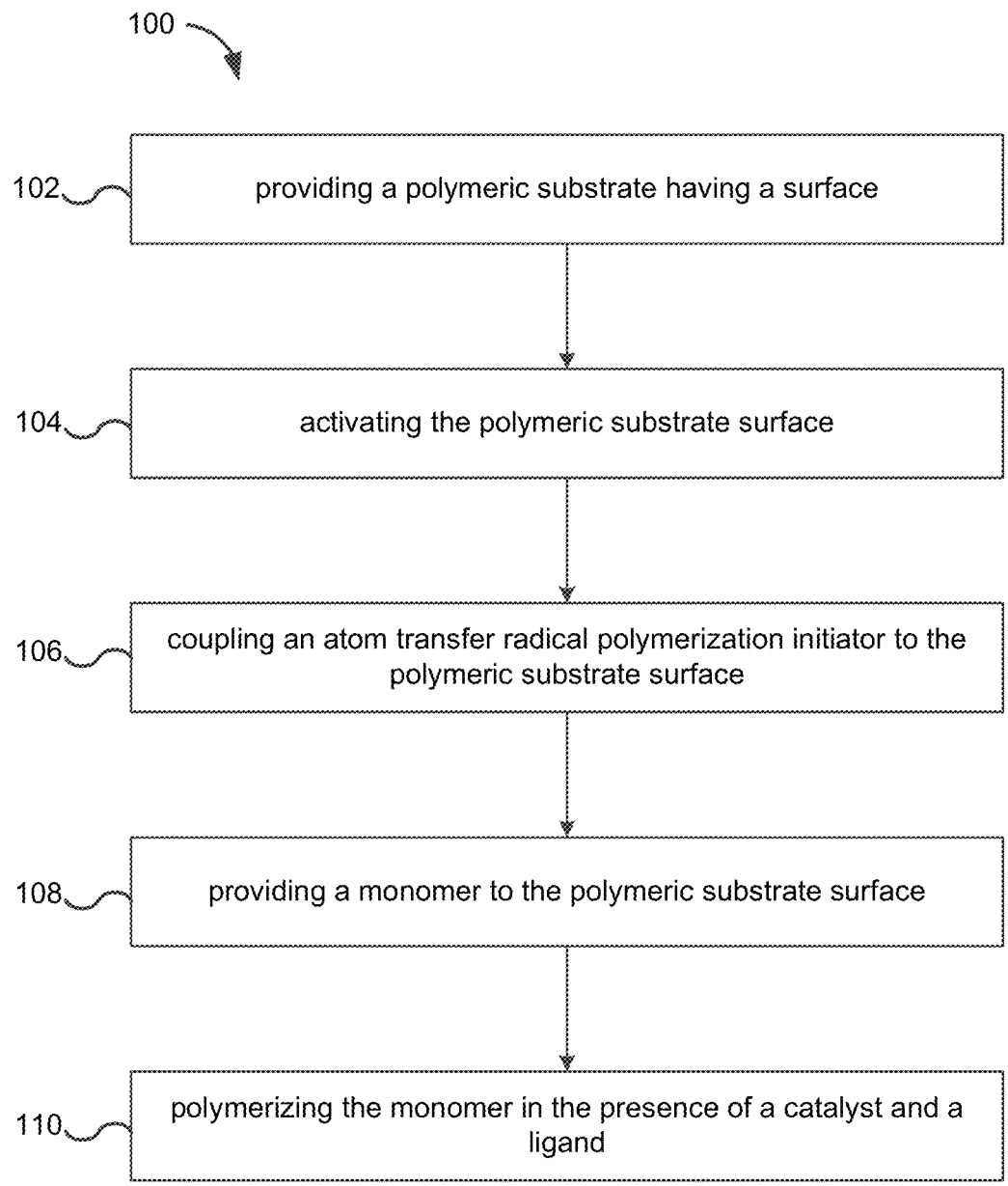
FIG. 1A is a chart of a method of modifying a polymeric surface according to some embodiments of the present disclosure.

Referring now to FIG. 1A, aspects of the disclosed subject matter include a method 100 for modifying a polymeric surface. At 102, a polymeric substrate having a surface is provided. In some embodiments, the polymeric substrate is a separation membrane, e.g., a nanofiltration membrane. In some embodiments, the polymeric substrate is a device or structure for implantation in an organism, e.g., a human patient. In some embodiments, the polymeric substrate surface for modification is substantially chemically inert prior to performance of method 100. In some embodiments, the polymeric substrate surface is hydrophobic. In some embodiments, polymeric substrate surface is composed of poly(vinylidene) fluoride, polyether ether ketone, poly(aryl sulfone), poly(ether sulfone), polycarbonate, poly(ethylene terephthalate), polyamide, poly(tetrafluoroethylene), poly (dimethyl siloxane), polypropylene, polyethylene, polyimide, or combinations thereof. In some embodiments, the steps of method 100 can be performed in any suitable order.

At 104, the polymeric substrate surface is activated. In some embodiments, activating 104 the polymeric substrate surface includes treating the polymeric substrate surface with atmospheric pressure plasma. In some embodiments, the plasma is composed of helium, oxygen, ammonia, argon, or combinations thereof. In some embodiments, the atmospheric pressure plasma process is performed at a power and treatment duration that activates the polymeric substrate surface, but does not etch the polymeric substrate surface. In some embodiments, the atmospheric pressure plasma process is performed at a power less than about 220 W. In some embodiments, the atmospheric pressure plasma process is performed at a power less than about 150 W. In some embodiments, the atmospheric pressure plasma process is performed at a power of about 120 W. In some embodiments, the atmospheric pressure plasma process is performed at a scan speed of about 0.1 mm/s to about 10 mm/s. In some embodiments, the atmospheric pressure plasma process is performed at a scan speed of about 1 mm/s to about 3 mm/s. In some embodiments, the atmospheric pressure plasma process is performed at a scan speed of about 2.1 mm/s.

At 106, an initiator is coupled to the polymeric substrate surface. In some embodiments, the initiator is an ATRP initiator. In some embodiments, the initiator is composed of an alkyl halide compound. In some embodiments, the initiator is composed of an alkyl bromide compound. In some embodiments, the initiator is composed of alpha-bromoisobutyryl bromide, ethyl alpha-bromoisobutyrate, (3-trimethoxysilyl)propyl 2-bromo-2-methylpropionate, halogenated silanes, or combinations thereof. In some embodiments, a scavenger compound is also added during initiator coupling 106. In some embodiments, the scavenger compound is composed of trimethylamine, triethylamine, or combinations thereof. In some embodiments, the initiator-coupled polymeric substrate surface is washed (not pictured) with a solvent to remove residual reactants. In some embodiments, this solvent is composed of acetonitrile, ethanol, or combinations thereof.

At 108, a monomer is provided to the polymeric substrate surface. At 110, the monomer is polymerized in the presence of a catalyst and a ligand. In some embodiments, polymerizing monomer 110 occurs at a reaction temperature above about 273K. In some embodiments, polymerizing monomer 110 occurs at a reaction temperature above about 330K. In some embodiments, the reaction temperature is about 360K. In some embodiments, the monomer is hydrophilic. In some embodiments, the monomer is hydrophobic. In some embodiments, the monomer is a mixture of monomers for polymerization into copolymers. In some embodiments, the monomer is a mixture of hydrophilic and hydrophobic monomers. In some embodiments, the monomer is a vinyl monomer. In some embodiments, the monomer is a methacrylate monomer. In some embodiments, the monomer is an alkyl methacrylate, styrene, glycidyl methacrylate, ethylene glycol methyl ether methacrylate, di(ethylene glycol) methyl ether methacrylate, or combinations thereof. In some embodiments, the alkyl methacrylate is methyl methacrylate, hexyl methacrylate, stearyl methacrylate, or combinations thereof. In some embodiments, the catalyst is a copper catalyst. In some embodiments, the copper catalyst is copper bromide or copper chloride. In some embodiments, the ligand is N,N,N',N',N'' pentamethyldiethylenetriamine, tris (2-pyridylmethyl)amine, or tris[2-(dimethylamino)ethyl] amine.

Figure 1B:
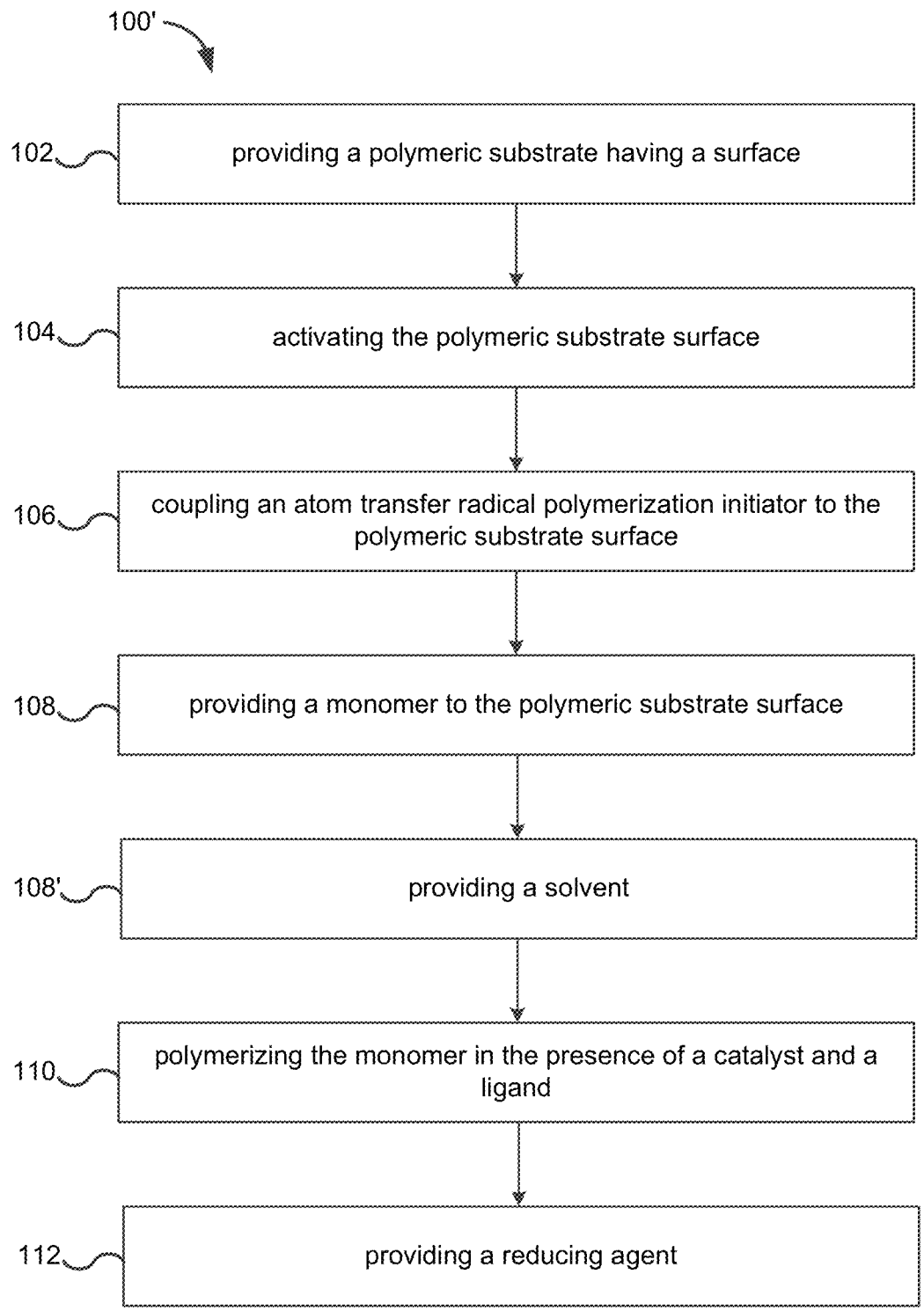
FIG. 1B is a chart of a method of modifying a polymeric surface according to some embodiments of the present disclosure.

Referring now to FIG. 1B, a method 100' for modifying a polymeric surface includes, at 108', providing a solvent. Any solvent compatible with the polymeric surface can be used. In some embodiments, the solvent is composed of toluene, anisole, ethanol, or combinations thereof. At 112, a reducing agent is provided. Any suitable reducing agent can be used. In some embodiments, the reducing agent is composed of ascorbic acid, sodium ascorbate, tin (II) 2-ethylhexanoate, or combinations thereof.

Referring now to both FIGS. 1A and 1B, in some embodiments, the monomer and the atom transfer radical polymerization initiator are provided at a molar ratio of at least about 400:1. In some embodiments, the monomer and the atom transfer radical polymerization initiator are provided at a molar ratio of about 800:1. In some embodiments, the catalyst and the initiator are provided at a molar ratio of about 0.1:1. In some embodiments, the reducing agent and the catalyst are provided at a molar ratio of about 10:1. In some embodiments, the catalyst and the ligand are provided at a molar ratio of about 1:1 to about 1:10.

Advantages of the methods consistent with the embodiments of the present disclosure begin with polymeric substrate surface activation via atmospheric pressure plasma. The atmospheric pressure plasma activation step provides significantly more bonding sites only at the surface of the polymeric substrate, reaction time and monomer wastage for the ATRP process are reduced. Specifically, the activated surface includes various oxygenated functional groups, e.g., hydroxyl groups. ATRP initiators can then be covalently coupled to the surface via an ester linkage.

Figure 2:
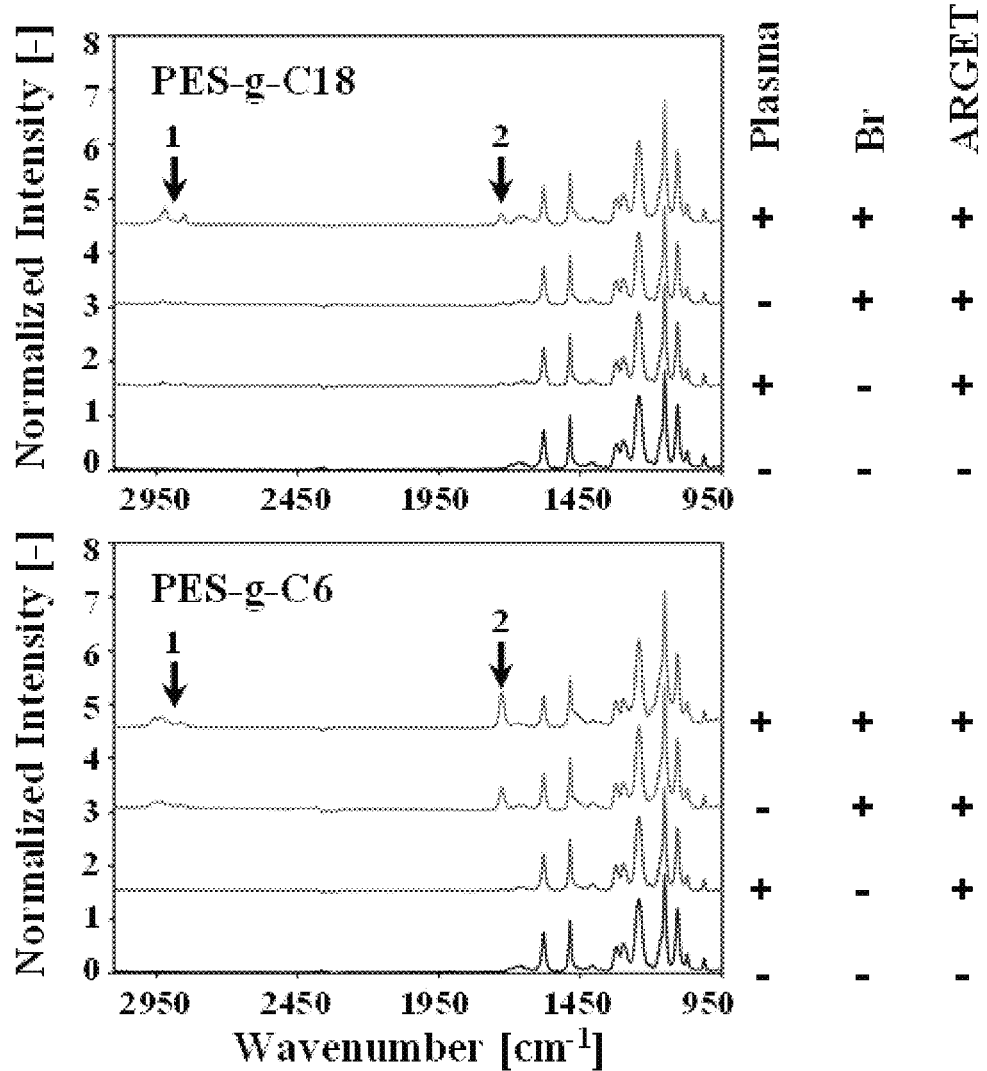
FIG. 2 is a graph showing attenuated total reflectance Fourier transform infrared spectroscopy (ATR-FTIR) spectra of polymeric substrate surfaces.

FIG. 2 shows ATR-FTIR spectra of poly(ether sulfone) substrates modified according to some embodiments of the present disclosure. The key to the right identifies which procedures were performed on the substrates, namely plasma activation, initiator attachment (Br), and monomer grafting. Saturated hydrocarbon absorbance is labeled as "1" and ester functionality is labeled as "2." As can be seen in this graph, the unmodified poly(ether sulfone) membrane did not have a peak in the range characteristic of ester functionalities. When atmospheric pressure plasma activation was absent and only initiator attachment was performed prior to monomer grafting, there was a detectable amount of ester functionality. However, when atmospheric pressure plasma activation was performed with initiator attachment and monomer grafting, the absorbance due to ester functionality increased considerably.

Figure 3A:
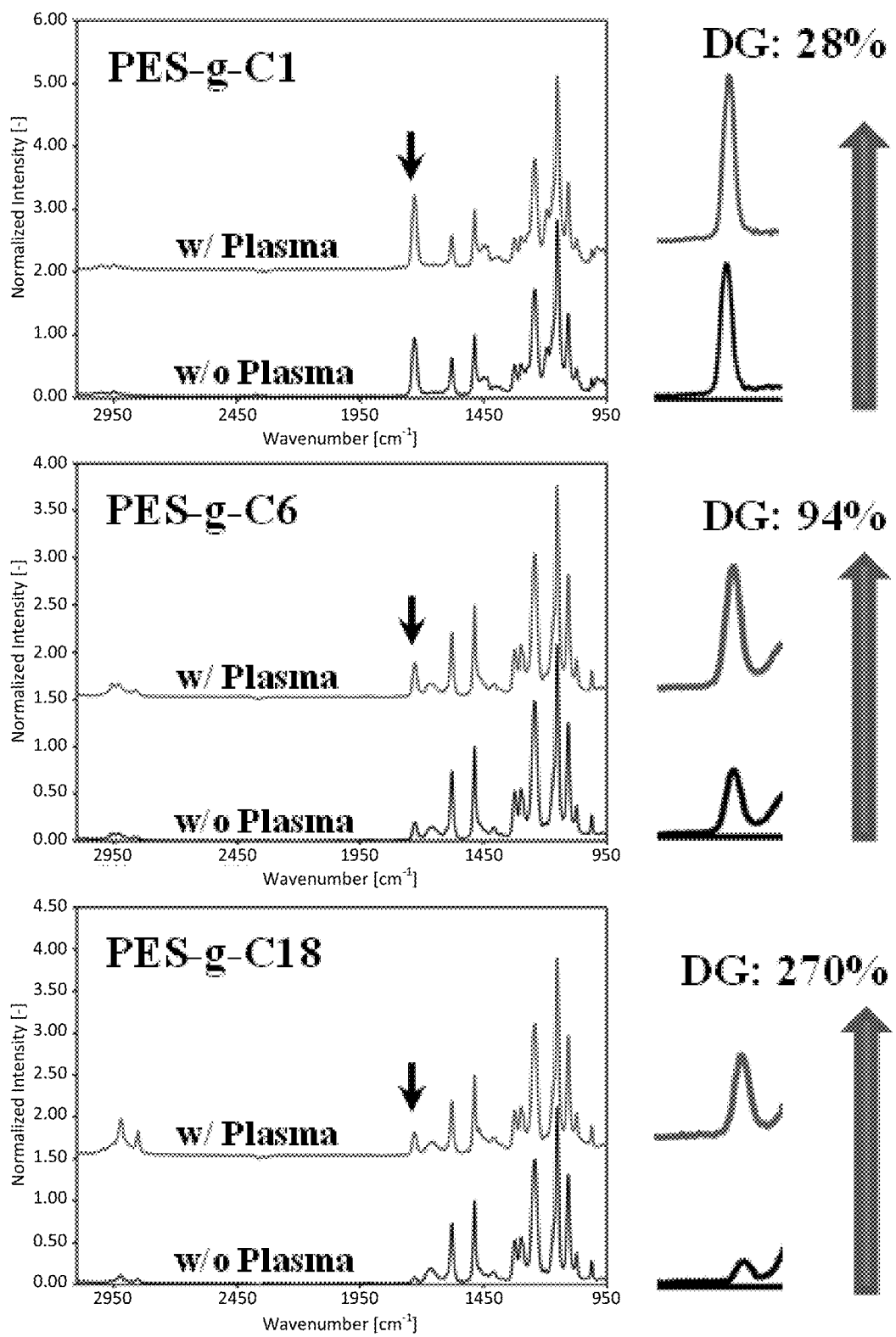
FIG. 3A is a graph showing ATR-FTIR spectra of polymeric substrate surfaces including grafted monomers, with and without atmospheric pressure plasma activation.
Figure 3B:
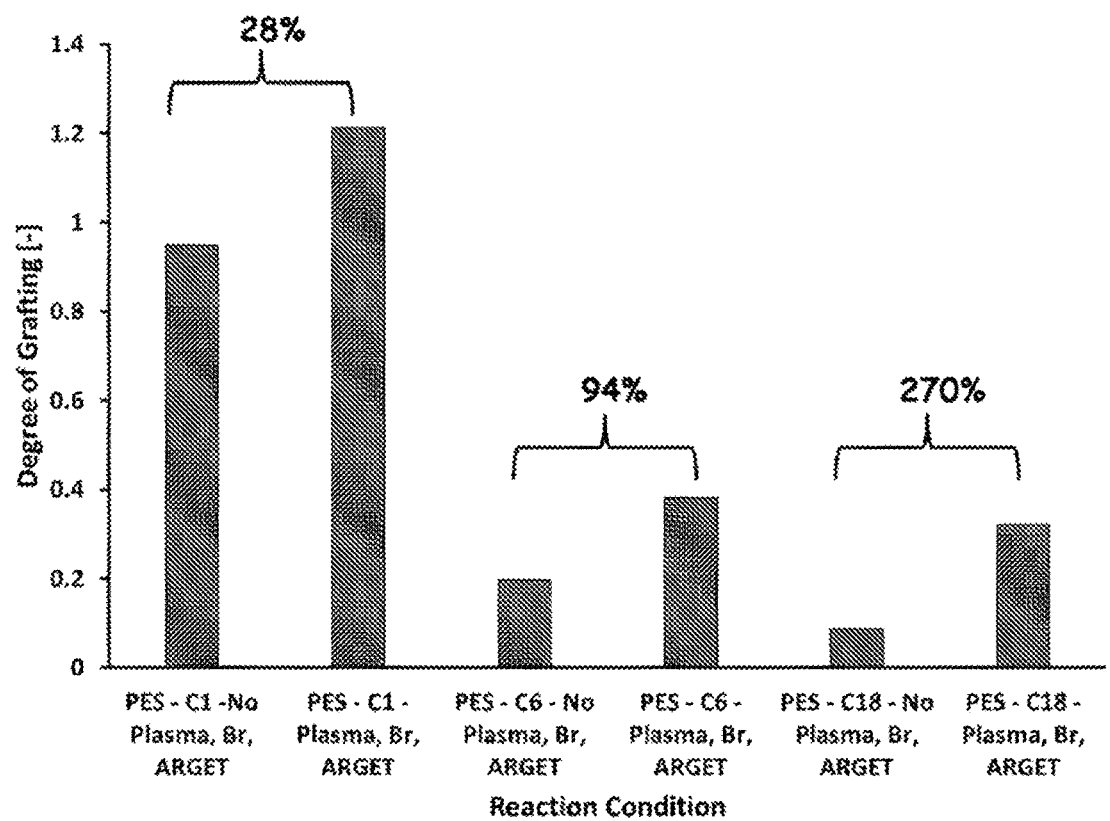
FIG. 3B is a graph showing degree of grafting on polymeric substrate surfaces, with and without atmospheric pressure plasma activation.

Referring now to FIGS. 3A and 3B, the influence of the atmospheric pressure plasma activation was investigated. The degree of grafting on the substrate was higher when utilizing atmospheric pressure plasma activation for each tested monomer. Surface grafting on the substantially chemically inert polymeric substrate surfaces increased by as much as 270% as compared to a non-plasma-treated surface.

The increased grafting also helps structure the grafted polymers advantageously in the "brush regime" rather than the "mushroom regime". Additionally, the increase in tunability in these polymeric substrates was achieved without sacrificing other advantageous bulk substrate properties such as mechanical strength. Finally, the methods of the present disclosure have general applicability to a myriad of implementations, such as fouling and permeation properties in desalination, organic solvent recovery, and other membranes; medical devices seeking a biocompatible coating; and marine surfaces such as boats, pylon structures, etc.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed is:

1. A method of modifying a polymeric surface comprising:
   providing a polymeric substrate having a surface;
   treating said polymeric substrate surface with helium and oxygen atmospheric pressure plasma at a power of 120 W to form an activated polymeric substrate surface;
   contacting said activated polymeric substrate surface with atom transfer radical polymerization initiator in the presence of a scavenger compound;
   providing a monomer to said activated polymeric substrate surface; and
   polymerizing said monomer in the presence of a catalyst and a ligand, wherein said polymeric substrate surface is composed of poly(ether sulfone).

2. The method according to claim 1, further comprising providing a reducing agent.

3. The method according to claim 2, wherein said reducing agent is composed of ascorbic acid, sodium ascorbate, tin (II) 2-ethylhexanoate, or combinations thereof.

4. The method according to claim 1, further comprising providing a solvent.

5. The method according to claim 4, wherein said solvent is composed of toluene, anisole, ethanol, or combinations thereof.

6. The method according to claim 1, wherein said initiator is composed of alpha-bromoisobutyryl bromide, ethyl alpha-bromoisobutyrate, (3-trimethoxysilyl)propyl 2-bromo-2-methylpropionate, halogenated silanes, or combinations thereof.

7. The method according to claim 1, wherein said catalyst is a copper catalyst.

8. The method according to claim 1, wherein said copper catalyst is copper bromide or copper chloride.

9. The method according to claim 1, wherein said ligand is N,N,N',N",N" pentamethyldiethylenetriamine, tris(2-pyridylmethyl)amine, or tris[2-(dimethylamino)ethyl]amine.

10. The method according to claim 1, wherein said monomer is an alkyl methacrylate, styrene, glycidyl methacrylate, or combinations thereof.

11. The method according to claim 1, wherein said monomer and said atom transfer radical polymerization initiator are provided at a molar ratio of at least about 400:1.

12. The method according to claim 1, wherein said catalyst and said atom transfer radical polymerization initiator are provided at a molar ratio of about 0.1:1.

13. The method according to claim 1, wherein said reducing agent and said catalyst are provided at a molar ratio of about 10:1.

14. The method according to claim 1, wherein said catalyst and said ligand are provided at a molar ratio of about 1:1 to about 1:10.

15. The method according to claim 1, wherein polymerizing said monomer occurs at a reaction temperature above about 273 K.

16. The method according to claim 1, wherein the scavenger compound includes trimethylamine, triethylamine, or combinations thereof.

17. A method of modifying a polymeric surface comprising:

providing a polymer substrate having a hydrophobic surface;

treating said hydrophobic polymer substrate surface with helium and oxygen atmospheric pressure plasma at a power of 120 W to form an activated hydrophobic polymer substrate surface;

providing the activated hydrophobic polymer substrate surface to a solution including a scavenger compound;

providing atom transfer radical polymerization initiator to the solution to couple atom transfer radical polymerization initiator to said activated hydrophobic polymer substrate surface; and polymerizing hydrophilic monomers on said activated hydrophobic polymer substrate surface in the presence of a catalyst, a ligand, and a reducing agent, wherein said polymeric substrate surface is composed of poly(ether sulfone).

18. The method according to claim 17, wherein said monomer is ethylene glycol methyl ether methacrylate, diethyleneglycol methyl ether methacrylate, or combinations thereof.

19. The method according to claim 17, wherein said atom transfer radical polymerization initiator is composed of an alkyl bromide or halogenated silane compound and wherein said catalyst is composed of a copper catalyst.

20. The method according to claim 17, wherein the scavenger compound includes trimethylamine, triethylamine, or combinations thereof.

* * * * *